United States Patent Office 3,519,020
Patented July 7, 1970

3,519,020
MIXING VALVE
Gaston Perret-Gentil, Le Parc, Lonay, Switzerland
Filed Apr. 11, 1968, Ser. No. 720,670
Claims priority, application Switzerland, Apr. 16, 1967,
5,513/67; Sept. 3, 1967, 12,306/67
Int. Cl. F16k 11/00
U.S. Cl. 137—625.17                    8 Claims

ABSTRACT OF THE DISCLOSURE

A mixing valve comprising means for varying the relative quantities of hot and cold water fed to a mixing chamber as well as the total quantity of water fed thereto comprising a cylinder containing a piston which is rotatable with respect thereto and axially movable with respect thereto whereby selective numbers of grooves in the piston may be aligned with the hot and cold water inlets by relative rotation and selective portions of all of the aligned grooves may be juxtaposed to the hot and cold water inlets by relative translation of the piston within the cylinder. A sealing means is provided between the hot and cold water inlets whereby regardless of the relative rotation or translation between the piston and cylinder, the hot and cold water inlets are always sealed from each other. In one embodiment, safety ducts are provided to permit leakage to the outlet in the event the sealing means is not working properly, rather than permitting flow from one of the inlets to the other. In another embodiment of the invention, the entire orifice which communicates one of the inlets through the piston and the cylinder is closed by a sealing means when that inlet is to be closed.

---

The present invention relates to a mixing valve, and relates more particularly to a mixing valve wherein hot and cold water received from sources of the same are mixed prior to passage to an outlet in desired proportion. The mixing valve includes a piston which is both rotatable and axially translatable within a cylinder, the inlets and outlet being formed in the cylinder and the piston containing a plurality of grooves or apertures, all or part of which may be aligned with the respective inlets to vary both the relative amount of hot and cold water flowing through the valve as well as the total quantity of water. With such mixing valves, it is important to preclude passage from one of the inlets to the other whereby various techniques have been utilized to segregate the inlets. However, as will be obvious, when a construction is provided wherein both relative rotation and axial displacement is provided for, such segregation is particularly difficult.

Thus, it is a primary object of the instant invention to provide a mixing valve having a sealing means which is capable of segregating the hot and cold water inlets from each other, regardless of the relative rotation or axial displacement between the piston and the cylinder. Another object of the instant invention is the provision of safety ducts in such a sealing means whereby, in the event the sealing means is not functioning properly, leakage of either hot or cold water directly to the outlet can occur before leakage will occur from one inlet to the other.

Yet another object of the instant invention is the provision of a means whereby the entire orifice which communicates between one of the inlets and the outlet through the piston and the cylinder is completely sealed when the elements are arranged in a manner which is intended to seal that inlet.

Other and further objects of the instant invention reside in the combination of elements, arrangement of parts and features of construction.

Still other objects will in part be obvious and in part be pointed out as the description of the invention proceeds and as shown in the accompanying drawings wherein.

Figure 1:
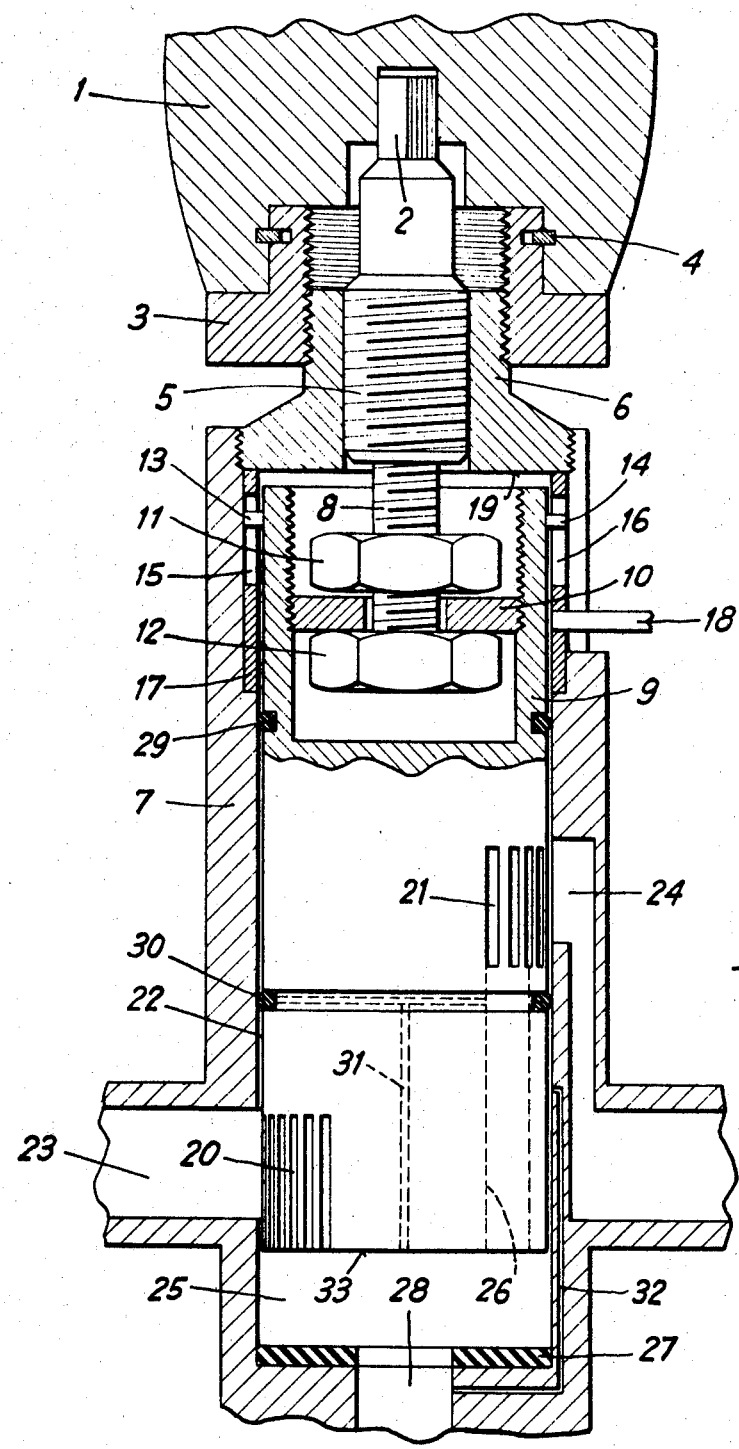
FIG. 1 is a schematic longitudinal view of a first embodiment of a mixing valve according to the instant inventive concepts.

Referring now particularly to the embodiment of FIG. 1, a portion of a control handle is designated generally by the reference numeral 1. The control handle 1 includes an element 2 fixed to a ring 3 by a disc 4. A portion of the element 2 is threaded as shown at 5 and cooperatively engages a cover member or nut 6 fixedly secured in any conventional manner to the body of the mixing valve which is designated generally by the reference numeral 7. A reduced diameter further portion of the element 2 is also threaded as shown at 8 for a purpose to be described in more detail hereinafter.

The mixing valve 7 includes a piston 9 having a hollow upper portion in which is fixed in any conventional manner, a ring 10. The threaded portion 8 of the element 2 passes through the ring 10 and cooperates with two nuts 11 and 12 to threadably secure this portion 8 of the element 2 to the piston 9 in a manner such as to permit relative rotation between the piston 9 and the control handle 1.

This relative rotation is effected in the following manner. At its upper portion, the piston 9 carries two pins 13 and 14, positioned, for example, diametrically opposite, as shown in FIG. 1. The pins 13 and 14 cooperate with two blind slots 15 and 16 in a sleeve 17 which, for example, may be rotated by engagement of a portion of a lever 18 which extends to the exterior of the body portion of the mixing valve 7 through an aperture defined in the body portion, the interior end of the lever 18 being fixedly secured to the sleeve 17. The sleeve 17 is rotatably mounted with respect to the body portion of the mixing valve 7 and is held in place by abutment of the lower face of the nut 6 as will be seen in FIG. 1. Thus, rotation of the sleeve 17 by movement of the lever 18 causes rotation of the piston 9 with respect to the control handle 1.

The piston 9 can include, for example, two groups or series of grooved passageways 20 and 21, respectively, in its lower and medial portions. These grooves cooperate with openings 23 and 24, respectively, preferably square or rectangular in shape, these openings being formed in a cylinder 22 defined by the interior of the body portion of the mixing valve 7. The opening 23 communicates through suitable conduit means with a source of hot water and the opening 24 communicates through suitable conduit means with a source of cold water.

In addition to the relative rotation which exists between the piston 9 and the cylinder 22 as will be readily recognized from the foregoing description, the piston 9 is arranged for relative sliding movement or axial displacement within the cylinder 22. The relative rotation permits the alignment of selected numbers of grooves 20 or 21 with their cooperating openings 23 or 24, respectively, and the relative translation permits the presentation of selected portions of the aligned grooves 20 or 21 with their respective cooperating openings 23 or 24, respectively. Thus, the relative rotation varies the relative quantity of hot and cold water fed into the grooves 20 and 21 from the inlets or openings 23 or 24, and the relative translation controls the total quantity of water fed into the grooves 20 or 21 from the openings 23 or 24.

The hot and cold water is combined in a mixing chamber 25 defined by the lower portion of the cylinder 22. The hot water passes directly to the mixing chamber 25 through the grooves 20, the lower portions of which are opened at the bottom or lower face 33 of the piston 9. The cold water passes from the grooves 21 into a channel 26 in the interior of the piston 9 which communicates with the mixing chamber 25 as shown in FIG. 1.

At its lower part, the mixing chamber 25 forms a seat for a flat gasket 27 pressed against the bottom of the cylinder, the gasket 27 having a central opening overlying the outlet 28 from the mixing chamber 25 and thus from the mixing valve 7.

The piston 9 includes two sealing elements 29 and 30, respectively, and a safety duct 31 connecting at least one point of the contact surface between the sealing element 30 and the piston 9 with the mixing chamber 25 and thus the outlet 28, as shown in FIG. 1. Additionally, the wall of the cylinder 22 includes a further safety duct 32 connecting at least one point of the contact surface between the sealing element 30 and the surface of the cylinder 22 directly with the outlet 28, when the lower face 33 of the piston 9 is in contact with the gasket 27.

In a modified embodiment (not shown), the sealing element 30 could be mounted on the lateral surface of the cylinder 22, rather than on the piston 9.

The operation of the embodiment of the invention shown in FIG. 1 is as follows:

The rotating control of the piston 9 by the lever 18 juxtaposes a certain number of grooves 20 and/or 21 with their respective openings 23 and 24. If the number of grooves 20 juxtaposed to the opening 23 increases, then the number of grooves 21 juxtaposed to the opening 24 decreases in the same amount, and vice-versa, since the grooves on the piston 9 are so-arranged in the embodiment shown in the drawings. In this manner, one can regulate the relative quantities of hot and cold water fed to the mixing chamber 25 and thus to the outlet 28 from the mixing valve 7. The rotation of the piston 9 can be limited at opposite extremes corresponding to the stopping of the flow of either the hot or cold water by engaging the lever 18 with opposite lateral edges of the aperture defined in the body portion of the mixing valve 7 thereby limiting the amplitude of movement of the lever 18 or other such operating means.

The axial movement or displacement of the piston 9 is controlled by the handle 1 in an obvious manner thereby regulating the portion of the height of the grooves 20 and/or 21 juxtaposed to the openings 23 and 24, respectively. This functions to regulate the total flow of hot and/or cold water brought into the mixing chamber 25 through the grooves 20 and 21, and thus to the outlet 28 from the mixing valve 7, until the complete closing of the openings 23 and 24 is effected by the surface of the piston 9 when the lower face 33 of the piston 9 engages the gasket 27 thereby ensuring a complete stoppage of the flowing water to the outlet 28, and, in conjunction with the sealing element 30, a total separation or segregation between the hot water from the opening 23 and the cold water from the opening 24. In this closed position, the safety ducts 31 and 32 do not receive any flowing water when the sealing element 30 is functioning properly to ensure a complete sealing between the surfaces of the piston 9 located on opposite sides of the sealing element 30. However, when the aforesaid proper functioning of the sealing element 30 is not present, a dicharge of water occurs to the outlet 28 through the intermediary of one or both of the safety ducts 31, 32. This discharge functions as a safety measure to prevent the possibility of an undesirable circulation of water between the openings 23 and 24, and brings to the attention of the operator the imperfect functioning of the sealing element 30. In a modified embodiment (not shown), the grooves 20 and 21 could be replaced by at least two openings of square or rectangular shape, if desired.

Figure 2:
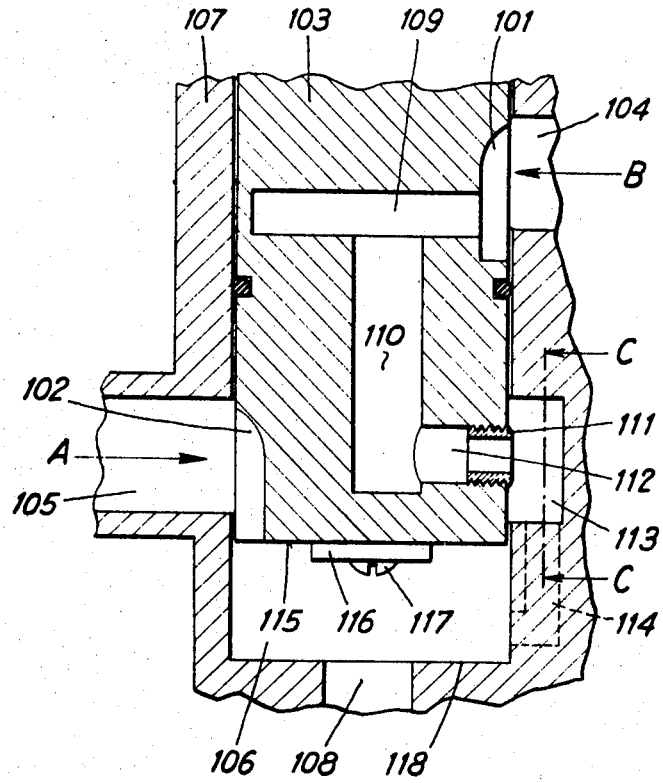
FIG. 2 is a partial schematic longitudinal view of a portion of a second embodiment of a mixing valve according to this invention.

In the embodiment of FIG. 2, the mixing valve is further characterized by the fact that at least for one complete closing position of at least one of the series of passages adjacent the surface of the cylinder, the entire orifice of communication between the piston and the portion of the cylinder communicating with the series of passages, is closed by a further sealing means. It should be understood that the embodiment of FIG. 2 includes the novel characteristics previously described when discussing FIG. 1, particularly with regard to the means for controlling rotation and translation of the piston with respect to the cylinder.

In FIG. 2, the grooves 101 and 102 which constitute the passages of the piston 103 are juxtaposed to the openings 104 and 105 for the admission of hot and cold water, respectively.

Figures 3, 4, 5:
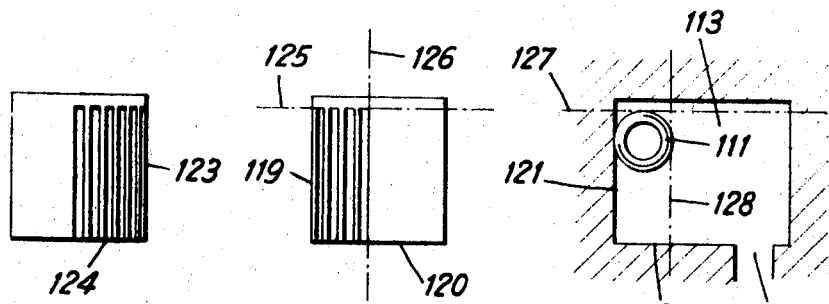
FIG. 3 is a fragmentary schematic view of a portion of the embodiment of FIG. 2 looking in the direction of the arrow designated as A in FIG. 2.
FIG. 4 is a fragmentary schematic view of a further portion of the embodiment of FIG. 2 looking in the direction of the arrow designated as B in FIG. 2; and, FIG. 5 is a fragmentary schematic cross-sectional view taken substantially along the lines C—C of FIG. 2.

The hot water flows through the grooves 101, a number of which are visible in FIG. 4, and then to the mixing chamber 106 formed by the lower portion of the cylinder 107, and the outlet 108, through the intermediary of passageways 109, 110 and 112 which communicate with a chamber 113 in the cylinder 107. The outlet portion of the passageway 112 contains a sealing means 111 of tubular construction, the function of which will be explained in more detail hereinafter. The chamber 113 is connected to the mixing chamber 106 through a further passageway 114.

The cold water flows through the grooves 102, a number of which are visible in FIG. 3, these grooves 102 communicating via the lower face 115 of the piston 103 with the mixing chamber 106 and thus, the outlet 108 as will be seen in FIG. 2. In the position shown in FIG. 2, the gasket 116, fixed by a screw 117 to the lower face 115 of the piston 103, does not rest in sealing relationship on the seat 118 at the bottom of the cylinder 107, whereby the mixed water goes through the outlet 108.

The operation of the embodiment of FIG. 2 is as follows:

By rotating the piston 103 from the position shown in FIG. 4 to a position wherein the grooves 101 are completely closed by moving the same past the edge 119 of the opening 104, the sealing means 111 shown in FIG. 5 will be completely in contact with the wall portion of the cylinder 107 located immediately beyond the edge 121 of the chamber 113 shown in FIG. 5. Actually, the position of the chamber 113 is fixed such that the line 128 parallel to the edge 121 of the chamber 113 and tangent to the edge of the furthest portion of the sealing means 111 from the edge 121, is located at the same distance from the edge 121 as the line 126, passing through the edge of the last groove as shown in FIG. 4, is located from the edge 119 of the opening 104. In this "closed" position (with respect to the hot water), the sealing means 111 prevents a flow of hot water which might occur between the piston and the cylinder at the opening 104 from reaching the interior of the cylinder and mixing with the cold water. In this "closed" position (with respect to the hot water), all of the grooves 102 which form passageways for the admission of cold water are disposed in "open" or juxtaposed position with respect to the opening 105 parallel to the edge 123 of the opening 105 as shown in FIG. 3. Thus, while cold water is flowing to the outlet 108, the hot water inlet is completely closed by the sealing means 111.

If the piston 103 is moved axially, that is displaced, starting from the position shown in FIG. 4 so as to plug the grooves 101 entirely (again, the hot water grooves are referred to, although in this instance, the cold water grooves would also be plugged entirely) by moving the same distance from the edge 122 as the line 125, passing means 111 will be completely in contact with the wall portion of the cylinder 107 located immediately beyond the edge 122 of the chamber 113 as seen in FIG. 5. Actually, the position of the chamber 113 is fixed such that the line 127, parallel to the edge 122 of the chamber 113 and tangent to the edge of the furthest portion of the sealing means 111 from the edge 122, is located at the same distance from the edge 122 as the line 125, passing through the top of the grooves 101 as seen in FIG. 4, is located from the edge 120 of the opening 104. In this position of stoppage, which corresponds to the position in which the gasket 116 sealingly engages the seat 118, and which corresponds, simultaneously, for the slots visible in FIG. 3, to the complete stoppage thereof, by movement below the edge 124 of the opening 105, the sealing means 111 will prevent the possibility that a flow of hot water which could occur between the piston and the cylinder at the opening 104, would communicate with a flow of cold water.

In a further modified embodiment of the instant invention (not shown), the passageway 112 could carry no sealing means such as 111, and instead, sealing means could be fixed to the walls of the cylinder such that they would be in contact with the end of the passageway 112 in the closed position of the grooves 101. Further, where the surface of the piston surrounding the grooves is not formed of a material which can ensure sealing tightness between the contacting parts, one can render the same sealing-tight, for example, by mounting on the piston an annulus of elastic material which would surround the openings in at least a closing position of the grooves.

It is to be understood, of course, that according to the present invention, the cylinder is formed by a socket fixed in the body of the mixing valve 7, the socket having on its lateral surface the aforesaid apertures and passageways. Additionally, it is to be understood that the piston can also be formed by several welded elements or rigidly assembled. Likewise the grooves could be of different or unequal dimensions so as to modify the rate of mixing with the discharge of hot and/or cold water according to the desired function.

From the foregoing, it is believed that the instant inventive concepts will be readily understood. Accordingly, what is claimed is:

1. A mixing valve comprising a body having a pair of inlet openings and an outlet opening, all communicating with a mixing chamber, said inlet openings being connected to sources of two liquids which are to be mixed in said mixing valve and said outlet opening removing the mixture from said mixing valve, said body of said mixing valve defining a cylinder and a piston slidably carried within said cylinder, said piston including at least two groups of grooved passages which may be respectively juxtaposed to said inlet openings, said piston being rotatable within said cylinder to align a selected number of each of said groups of grooved passages with their respective inlet openings in order to regulate the relative quantity of each liquid flowing to said mixing chamber, and said piston being axially translatable within said cylinder to juxtapose selected portions of said aligned grooved passages with their respective inlet openings in order to regulate the total quantity of liquid passing to said mixing chamber, a sealing means interposed between said series of passages and functioning to separate said inlet openings from each other for all positions of said piston relative to said cylinder, said sealing means including an annular gasket carried by a portion of said piston intermediate said groups of passages, and engaging between said piston and said cylinder, and at least one safety duct communicating between said outlet opening and said sealing means.

2. A mixing valve as defined in claim 1, wherein said safety duct communicates between said outlet opening and a point of contact between said piston and said sealing means.

3. A mixing valve as defined in claim 1, wherein said safety duct communicates between said outlet opening and a point of contact between said cylinder and said sealings means.

4. A mixing valve comprising a body having a pair of inlet openings and an outlet opening, all communicating with a mixing chamber, said inlet openings being connected to sources of two liquids which are to be mixed in said mixing valve and said outlet opening removing the mixture from said mixing valve, said body of said mixing valve defining a cylinder and a piston slidably carried within said cylinder, said piston including at least two groups of grooved passages which may be respectively juxtaposed to said inlet openings, said piston being rotatable within said cylinder to align a selected number of each of said groups of grooved passages with their respective inlet openings in order to regulate the relative quantity of each liquid flowing to said mixing chamber, and said piston being axially translatable within said cylinder to juxtapose selected portions of said aligned grooved passages with their respective inlet openings in order to regulate the total quantity of liquid passing to said mixing chamber, and a sealing means interposed between said series of passages and functioning to separate said inlet openings from each other for all positions of said piston relative to said cylinder, wherein in at least one completely closed position of at least one of said groups of passages, a passageway communicating said one group of passages between said piston and said cylinder is completely closed by a sealing means, a passageway in said piston communicating with a chamber in said cylinder which, in turn, communicates with said mixing chamber, said passageway in said piston carrying a sealing means at its terminal portions which engages against the portion of the wall defining said cylinder when said one group of passages are completely closed, said chamber being defined by portions of said cylinder including at least two sides which are mutually perpendicular, said terminal portions of said passageway traversing said sides of said chamber at the same time as said one group of passages are completely closed with respect to their cooperating inlet opening.

5. A mixing valve according to claim 4 wherein said mutually perpendicular sides are parallel to sides of said cooperating inlet opening which completely close said one series of passages on rotation of said piston with respect to said cylinder and on axial displacement of said piston with respect to said cylinder.

6. A mixing valve according to claim 4, wherein one of said mutually perpendicular sides is parallel to the axis of translation of said piston with respect to said cylinder.

7. A mixing valve comprising a cylindrical body having a pair of inlet openings and an outlet opening, a piston slidably carried within said body, a mixing chamber defined at one end of said body by an end face of said piston and a bottom face of said body, two groups of grooved passages provided within said piston and which may be respectively juxtaposed to said inlet openings to permit liquids to cross said openings and to flow into said mixing chamber, and means to axially translate said piston within said body to juxtapose each of said groups of passageways with one of said inlet openings and to rotate said piston about the axis of said body to align a selected number of each of said groups of passageways with their respective inlet openings in order to regulate the relative quantity of each liquid flowing to said mixing chamber, said means comprising a threaded shaft member screwed into a cover member fixedly secured to said body, said shaft being coaxial to said body and axially connected to but rotatable with respect to said piston, a rotating sleeve member mounted between said piston and the cylindrical wall of said body to rotate said piston with respect to said body, two control members to rotate said shaft and said rotating sleeve, respectively, and at least one angular gasket mounted in a groove provided in the side wall of said piston, the rotation of the piston being hindered by said gasket pressing against the body inner wall when said shaft is screwed or unscrewed into said cover member.

8. A mixing valve comprising a cylindrical body having a pair of inlet openings and an outlet opening, a piston slidably carried within said body, a mixing chamber defined at one end of said body by an end face of said piston and a bottom face of said body, two groups of grooved passageways provided within said piston and which may be respectively juxtaposed to said inlet openings to permit liquids to cross said openings and to flow into said mixing chamber, and means to axially translate said piston within said body to juxtapose each of said groups of grooved passageways with one of said inlet openings and to rotate said piston about the axis of said body to align a selected number of each of said groups of passageways with their respective inlet openings in order to regulate the relative quantity of each liquid flowing to said mixing chamber, said outlet opening being provided in the central portion of said bottom face, said groups of passageways each communicating with an inlet port provided in said mixing chamber, at diametrically opposed locations with respect to said central outlet opening and the angle between the directions of the liquids at their entering into the mixing chamber being different from 180°.

References Cited

UNITED STATES PATENTS

| | | | |
|---|---|---|---|
| 2,501,657 | 3/1950 | Barkelew | 137—625.17 |
| 2,764,181 | 9/1956 | Richolt | 137—625.40 X |
| 3,166,097 | 1/1965 | Hinderer et al. | 137—625.17 |
| 3,387,631 | 6/1968 | Pecis | 137—625.17 |
| 3,428,086 | 2/1969 | Glasgow | 137—625.3 |

FOREIGN PATENTS 1,169,235   4/1964   Germany.

WILLIAM R. CLINE, Primary Examiner